United States Patent [19]

Sand

[11] Patent Number: 4,812,495
[45] Date of Patent: Mar. 14, 1989

[54] ANAEROBIC ADHESIVE COMPOSITIONS

[75] Inventor: I. Daniel Sand, Jonesborough, Tenn.

[73] Assignee: Eastman Kodak Company, Rochester, N.Y.

[21] Appl. No.: 110,158

[22] Filed: Oct. 19, 1987

[51] Int. Cl.$^4$ .................. C08G 81/00; C08G 83/00
[52] U.S. Cl. ............................. 524/37; 524/38; 524/39; 524/40; 524/41; 523/176
[58] Field of Search ............. 524/37, 38, 39, 40, 524/41; 523/176

[56] References Cited

U.S. PATENT DOCUMENTS

| | | | |
|---|---|---|---|
| 2,628,178 | 2/1953 | Burnett et al. | 154/43 |
| 2,895,950 | 7/1959 | Krieble | 526/320 |
| 3,041,322 | 6/1962 | Krieble | 526/320 |
| 3,043,820 | 7/1962 | Krieble | 526/320 |
| 3,138,564 | 6/1964 | Borunsky | 527/313 |
| 3,218,305 | 11/1965 | Krieble | 526/320 |
| 3,425,988 | 2/1969 | Gorman et al. | 560/25 |
| 3,457,212 | 7/1969 | Fukuoka et al. | |
| 3,591,438 | 7/1971 | Toback et al. | 156/310 |
| 3,923,737 | 12/1975 | George et al. | |
| 3,944,521 | 3/1976 | Bradley et al. | |
| 4,373,077 | 2/1988 | Boeder | 526/309 |
| 4,374,940 | 2/1983 | Bhatia | 523/176 |
| 4,539,349 | 9/1985 | Blount et al. | 523/509 |
| 4,590,265 | 5/1986 | Bogan et al. | 536/63 |
| 4,603,160 | 7/1986 | Leonard | 524/127 |
| 4,605,721 | 8/1986 | Jenkins et al. | 527/312 |

OTHER PUBLICATIONS

G. O. Radchenko et al.: "Cellulose acetate peroxides", & Vysokomolekul. Soedin. Tsellyuloza I EE Proizvodyne SB. Statei 1963, 25–31.
Abstract Bulletin of the Institute for Pater Chemistry, vol. 34, No. 7, Mar. 1964, pp. 961–962, No. 4403; J. Alfoldi et al.: "Ozonization of cellulose acetates of varying degrees of acetylation", Faserforsch. Texiltech. 14, No. 9: p. 389 (Sep. 1963).
Research Disclosure, No. 239, Mar. 1984, pp. 90–91, No. 23917, Havant Hampshire, GB: "Cellulose ester derivatives and uses thereof".
Teintex, nr. 3, May 1976, pp. 129–140 M. Connen: "Obtention a la continue de polymeres cellulosiques greffes".
S. Mihailescu et al.: "Grafting of cellulose derivative with polyacrylonitrile and poly(acrylic acid)", and Cellul. Chem. Technol. (Jassy) 1968, 2(1), 25–33.
Faser Forschung and Textiltechnik, vol. 14, 1963, part 2, pp. 63–67 Vasilin, Feldman and Simionescu: "Die Pfropfung von Polyacrylonitril auf Cellulose".

Primary Examiner—John Kight
Assistant Examiner—Nathan M. Nutter
Attorney, Agent, or Firm—Thomas R. Savitsky; William P. Heath, Jr.

[57] ABSTRACT

Disclosed are anaerobic adhesive compositions which cure under anaerobic conditions, said compositions being comprised of at least one carboxylated cellulose ester such as carboxylated cellulose acetate butyrate or carboxylated cellulose acetate propionate, at least one acrylate monomer, and at least one hydroquinone-based stabilizer. The composition can optionally contain an accelerator.

29 Claims, No Drawings

ANAEROBIC ADHESIVE COMPOSITIONS

FIELD OF THE INVENTION

This invention relates to compositions which cure under anaerobic conditions.

BACKGROUND OF THE INVENTION

Anaerobic adhesive compositions are well known in the art and have been in commercial use for several years. A basic formulation contains acrylic monomers and a peroxide source as described in U.S. Pat. Nos. 2,628,178; 2,895,950; 3,041,322; and 3,218,305.

A typical peroxide source used in the art is cumene hydroperoxide. Oligomers and polymers have also been included in anaerobic adhesive formulations and, in particular, the unsaturated acrylate moiety has been covalently linked to the oligomer or polymer as described in U.S. Pat. Nos. 3,043,820 and 3,425,988.

Other additives for such formulations include agents to confer higher viscosity such as silicone dioxide. It has also been found that for certain applications the use of an accelerator of the adhesive cure is beneficial. Known accelerators include amines, occasionally used in combination with imides as taught in U.S. Pat. Nos. 4,373,077 and 4,374,940, or resins made from the reaction of amines with aldehydes as taught in U.S. Pat. No. 3,591,438. Saccharin is also commonly added to such formulations as a component of the accelerator system.

Carboxylated cellulose esters such as those described in U.S. Pat. No. 4,590,265 are commercially available as Eastacel® resins, available from Eastman Chemical Products, Inc., Kingsport, Tenn. Such esters have been used in conjunction with acrylic monomers to make graft copolymers as taught in U.S. Pat. No. 4,605,721, bulk acrylic castings as taught in U.S. Pat. No. 4,603,160, and in conjunction with unsaturated polyesters and acrylic monomers to make formulations as taught in U.S. Pat. No. 4,539,349.

Heretofore, the use of carboxylated cellulose esters in anaerobic adhesive formulations has been unknown.

SUMMARY OF THE INVENTION

It has been discovered that carboxylated cellulose esters are capable of performing several functions in anaerobic adhesives which heretofore have required multiple components. The carboxylated cellulose esters of the present invention simultaneously function as an initiating agent and as a viscosity modifying agent. In addition, anaerobic adhesive formulations can be made with a carboxylated cellulose ester which require no accelerator. Therefore, in the anaerobic adhesives of this invention, use of compounds such as cumene hydroperoxide, silicone dioxide, and saccharin are not necessary. Cumene hydroperoxide is an explosive oxidant, silicone dioxidide is known to cause preliminary edema, and saccharin is a known carcinogen, therefore, the adhesive compositions of this invention, without the need for such compounds, are a substantial advancement in the anaerobic adhesive art.

More specifically, the present invention is directed to an adhesive composition comprising:

(A) at least one carboxylated cellulose ester having an acid number greater than or equal to about 5 and less than or equal to about 50, a peroxide value of from about 0.05 to about 2, and from about 0.4 to about 4.0% by weight total carboxyl groups, (B) at least one acrylate monomer, and (C) at least one hydroquinone-based stabilizer;

the components (A), (B), and (C) being of a chemical nature and present in quantities and proportions such that when the final formulation is exposed to the atmosphere, said formulation will remain fluid and not cure for at least 8 hours at ambient temperature and that, when placed between surfaces which exclude the atmosphere from said formulation, said formulation will cure to form an effective adhesive bond between the surfaces within 24 hours at ambient temperature.

Preferably, the adhesive composition of the present invention comprises:

(A) at least one carboxylated cellulose ester having an acid number greater than or equal to about 5 and less than or equal to about 50, a peroxide value of from about 0.05 to about 2, and from about 0.4 to about 4.0% by weight total carboxyl groups;

(B) at least one acrylate monomer of the following formulas:

(a)

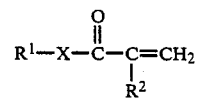

wherein X is O or $NR^3$, $R^1$ is H, phenyl or a straight-chain, branched or alicyclic alkyl radical of 1 to 8 carbon atoms, $R^2$ is H, halogen, or a straight-chain or branched alkyl radical of 1 to 4 carbon atoms, and $R^3$ is H or a straight-chain, branched or alicyclic alkyl radical of 1 to 8 carbon atoms, (b)

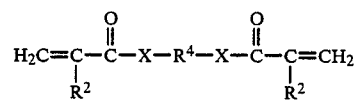

wherein each X, independently, and each $R^2$, independently, are as defined hereinabove, and $R^4$ is a straight-chain, branched or alicyclic alkyl diradical of 2 to 8 carbon atoms such that no carbon atom has more than one X bonded to it, (c)

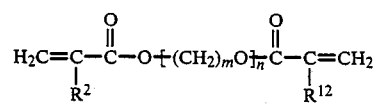

wherein each $R^2$, independently, is as defined hereinabove, m is 2, 3 or 4, and n is an integer of 1 to 12, or (d)

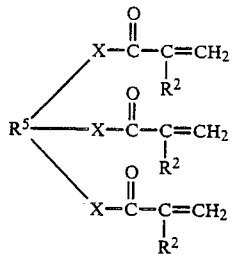

wherein each X, independently, and each $R^2$, independently, are as defined hereinabove, and $R^5$ is a straight-chain, branched or alicyclic alkyl triradical of 3 to 8 carbon atoms such that no carbon atom has more than one X bonded to it; and (C) at least one hydroquinone-based stabilizer of the formula

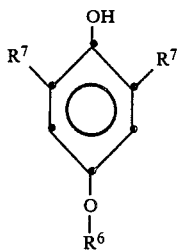

wherein $R^6$ is H or a straight-chain or branched alkyl radical of 1 to 4 carbon atoms, and each $R^7$, independently, is H or a straight-chain, branched or alicyclic alkyl radical of 1 to 8 carbon atoms; the components (A), (B), and (C) being present in quantities and proportions such that when the final formulation is exposed to the atmosphere, said formulation will remain fluid and not cure for at least 8 hours at ambient temperature and that, when placed between surfaces which exclude the atmosphere from said formulaton, said formulation will curre to form an effective adhesive bond between the surfaces within 24 hours at ambient temperature, provided that:

(1) the acrylate monomer or combination thereof must be able to dissolve the carboxylated cellulose ester to a final concentration of at least about 3 weight percent, based on the weight of carboxylated cellulose ester plus acrylate monomer, (2) phenyl-containing acrylate monomers must be used in combination with other acrylate monomers and the combination of acrylate monomers must be such that if one or more of the monomers has a phenyl radical as $R^1$ then the phenyl-containing monomers must be about equimolar or less relative to the other acrylate monomers, and (3) the total amount of acrylate monomers having X being $NR^3$ must be present at a molar level less than the sum of the total moles of carboxyl groups from the carboxylated cellulose ester and twice the total molar equivalent of peroxide content of the cellulose ester.

It is preferred that the adhesive compositions of the invention are such that component (A) is present at a concentration of from about 3 weight percent to about 30 weight percent based on the total weight of components (A) and (B), preferably from about 5 to about 20 weight percent; and component (C) is present at a concentration of greater than about 20 parts per million (ppm) and less than about 500 ppm based on the total weight of component (B).

It is preferred that $R^1$ is H or a straight-chain, branched or alicyclic alkyl radical of 1 to 6 carbon atoms; $R^2$ is H or an alkyl radical of 1 or 2 carbon atoms; $R^6$ is H or an alkyl radical of 1 or 2 carbon atoms; $R^7$ is H or a straight-chain or branched alkyl radical of 1 to 4 carbon atoms; and X is O. As is self-evident, in all cases a branched or alicyclic alkyl radical must have at least 3 carbon atoms.

DETAILED DESCRIPTION OF THE INVENTION

In addition to the advantages described hereinabove, the compositions of the present invention have other advantages over prior art anaerobic adhesives. These advantages include, but are not limited to one or more of the following:

(a) maintenance of bond strengths after exposure to high humidity, (b) improved bonding to greasy surfaces, (c) transparency of formulations designed for bonding glass to glass, and (d) increased reliability of the adhesive after long-term storage.

Carboxylated Cellulose Ester

The carboxylated cellulose esters useful in the present invention can be prepared by known techniques such as disclosed in U.S. Pat. No. 4,590,265, incorporated herein by reference.

The carboxylated cellulose esters of the present invention can be characterized principally on the basis of acid number, peroxide content, carboxyl content, and related values, as determined by potentiometric titration. More specifically, the acid number for the carboxylated cellulose ester can be determined by automatic instrumental potentiometric titration using any standard commercial instrument. The automatic titrimeter will commonly employ a typical combination electrode of the silver/silver chloride type which responds to changes in hydrogen ion concentration. To determine the acid number of a carboxylated cellulose ester product, a sample of the product (typically, 0.1 to 1 g) is dissolved in dimethylsulfoxide solvent. This solution is then titrated with a known concentration (usually 0.05 to 0.2N; typically, 0.1N) of tetramethyleneguanidine in 2-propanol. From the number of equivalents of base required to accomplish the titration is calculated the acid number (i.e., the number of milligrams of potassium hydroxide which would have been consumed in the neutralization of 1 g of the product sample).

The carboxylated cellulose ester product typically exhibits an acid number of at least about 5 and less than about 50. Preferably, the acid number of the carboxylated cellulose ester is about 10 to 35. In especially preferred embodiments, the acid number of the carboxylated cellulose ester product is about 10 to 25.

The carboxylated cellulose ester product may be characterized further by determining the molecular weight of the product, e.g., by means of a suitable indirect method, such as inherent viscosity (I.V.) and/or concentrated solution viscosity. Preferably, the relative molecular weight of the product is determined by dissolving at 120° C., 0.5 g of the product in 100 mL of a mixture of phenol and tetrachloroethane having a phenol:tetrachloroethane weight ratio of 60:40 and then measuring the inherent viscosity of the solution at 25° C. The carboxylated cellulose ester product has an inherent viscosity when measured in this manner of about 0.01 to 1.00. Preferably, the inherent viscosity is about 0.05 to 0.5.

The carboxylated cellulose ester product useful in the present invention contain stable (relatively) peroxide groups in concentrations of from about 0.05 to about 2.0 milliequivalents (meg) of $(\text{O—O})$ per gram of total ester, termed herein as "peroxide value." A preferred peroxide value is from about 0.10 to about 0.8.

The carboxylated cellulose ester product is compatible with a number of solvents. These solvents include methanol; methylene chloride; diacetone alcohol; lower alkanoic acids, such as formic acid, acetic acid, propionic acid, etc.; lower alkyl ketones, such as acetone, methyl ethyl ketone, methyl propyl ketone, methyl isobutyl ketone, methyl amyl ketone, etc.; esters, such as ethyl acetate, isopropyl acetate, n-butyl acetate, isobutyl acetate, 2-butoxyethyl acetate, 1-methoxy-2-propyl acetate, 2-ethoxyethyl acetate, etc.; ethers such as 2-ethoxyethanol, 2-propoxyethanol, 2-butoxyethanol, etc.; and mixtures, such as mixtures of toluene and/or xylene with ethanol, mixtures of ethanol with esters (e.g., ethyl acetate, 1-methoxy-2-propyl acetate, etc.), or the like. Of course, the above listing is not intended to be exhaustive, but is indicative of the variety of solvents which may be employed in conjunction with the products of the present invention.

The carboxylated cellulose esters useful in this invention are compatible with a wide range of resinous materials. Classes of resins with which the carboxylated cellulose esters are compatible include, but are not limited to, thermoplastic acrylics, thermoset acrylics, silicone resins, alkyd resins, ordinary cellulose esters, urea formaldehyde resins, melamine resins, urethanes, nitrocellulose, unsaturated and other themosetting polyester resins, etc.

Carboxyl groups of the carboxylated cellulose esters useful in the present invention are attached directly to the polymer backbone. In this manner, carboxyl groups which are retained on the polymer during hydrolysis are incorporated into the polymer. More specifically, from about 20% to 100%, preferably from about 30% to 100% of the carboxyl groups are non-saponifiable backbone (BBC), i.e., are attached at their α-carbons directly to the anhydroglucose rings.

The acid number, peroxide content, and I.V. values of the carboxylated cellulose esters are interrelated for any given type of ester. For example, the following Tables 1 and 2 show this relationship for carboxylated cellulose acetate butyrate and carboxylated cellulose acetate propionate.

TABLE 1
Acid Number, Peroxide Content and I.V. for Carboxylated Cellulcse Acetate Butyrate

| Acid Number | Peroxide Content | I.V. |
|---|---|---|
| 4.9 | 0.20 | 0.41 |
| 12.6 | 0.30 | 0.22 |
| 20.4 | 0.51 | 0.15 |
| 48.7 | 1.30 | 0.08 |

TABLE 2
Acid Number, Peroxide Content and I.V. for Carboxylated Cellulose Acetate Propionate

| Acid Number | Peroxide Content | I.V. |
|---|---|---|
| 4.9 | 0.20 | 0.43 |
| 11.6 | 0.35 | 0.23 |
| 49.0 | 1.30 | 0.07 |

The present preferred carboxylated cellulose esters useful in the present invention are the acetates, butyrates and propionates and are all hereinafter termed XAE and are defined as polymeric chains of anhydroglucose units having ring substituents comprising by weight based on total polymer weight, from about 0.05% to about 20% hydroxyl groups, from about 0.5% to about 44% acetyl groups, from 0% to about 54% butyryl groups, from 0% to about 47% propionyl groups, from about 0.4% to about 4.0% total carboxyl groups (terms include water soluble or water dispersible salts thereof) wherein from about 20% to 100%, preferably from about 30% to 100% of these carboxyl groups are BBC, and wherein the XAE contains from about $4.52 \times 10^{-5}$ to about $6.13 \times 10^{-4}$ moles of lactone moiety per gram of XAE, hereinafter termed "lactone level." In general, the XAE is further characterized as having an acid number (AN) from about 5 to about 50, a DP/COOH of from about 5 to about 80, and an I.V. (inherent viscosity) of from about 0.07 to about 0.45. The XAE contain stable (relatively) peroxide groups in concentrations of from about 0.05 to about 2.0 meq of $(\text{O—O})$ per gram of XAE. Also, the preferred XAE materials have I.V.'s of from about 0.10 to about 0.30, a lactone level of from about $9.68 \times 10^{-5}$ to aabout $3.22 \times 10^{-4}$, a peroxide value of from about 0.10 to about 0.8, a DP:COOH from about 8 to about 25, and a Hoeppler viscosity reduction factor, hereinafter termed "HVR" and defined below, of 0.01 to 0.95, most preferably from about 0.6 to about 0.95.

The most preferred carboxylated cellulose esters are carboxylated cellulose acetate butyrate and carboxylated cellulose acetate propionate. The preferred constituent ranges for carboxylated cellulose acetate butyrate are:

Acetyl 10%–15%
Propionyl 0%–4%
Butyryl 30%–40%
Hydroxyl 4%–20%
Total COOH 0.5%–2.5% and the preferred constituent ranges for carboxylated cellulose acetate propionate are:

Acetyl 1%–4%
Propionyl 40%–47%
Butyryl 0%–2%
Hydroxyl 1%–2.5%
Total COOH 0.5%–2.5%

With respect to the above characterizations of the present XAE regarding degree of polymerization (DP), and ester content (acetyl, propionyl, butyryl), see pages 118–143 of Kirk-Othmer, "Encyclopedia of Chemical Technology," 3rd Ed., Vol. 5, and the cited references, particularly 111 to 130, on page 141 thereof for methods for their determination.

The inherent viscosities or I.V.'s are determined according to ASTM D2857-70 procedure in a Wagner Viscometer of Lab Glass Inc., of Vineland, N.J., having a ½ mL capillary bulk using a polymer concentration of 0.5% by weight in 60/40 by weight, phenol/tetrachloroethane solvent. The procedure comprises heating the polymer/solvent system at 120° C. for 15 minutes to enhance dissolution of the polymer, cooling the solution to 25° C. and measuring the time of flow at 25° C. The I.V. ($\eta$) is calculated from the equation:

$$(\eta) \frac{25° C.}{0.50} = \frac{\ln \frac{t_s}{t_o}}{C}$$

where:
- ($\eta$) = Inherent viscosity at 25° C. at a polymer concentration of 0.5 g/100 mL of solvent;
- ln = Natural logarithm;
- $t_s$ = Sample flow time;
- $t_o$ = Solvent-blank time; and
- C = Concentration of polymer in grams per 100 mL of solvent = 0.50.

When the only acid functionality present in the carboxylated cellulose ester is carboxyl, then the acid number and the carboxyl content are directly related, i.e., the carboxyl content can be calculated from the acid number. The total carboxyl group content of carboxylated cellulose esters useful in the present invention wherein the only acid functionality present in the ester is carboxyl (backbone and extra-pendant, i.e., non-backbone) is best determined by weak base potentiometric titration using a Brinkmann 636/100 Titoprocessor and Program with E635 Dosimat and Exchange Unit using a Senorex® combination electrode or equivalent. In this method the carboxylated cellulose ester sample is dissolved in dimethylsulfoxide (DMSO) and titrated potentiometrically with standarized tetramethylguanidine (TMG) in isopropanol. The Titroprocessor controls the delivery of the titrant and provides a plotted curve of potential versus titrant volume. From an automatically determined end point, the Titroprocessor calculates the acid number "AN" and prints it with other parameters of the titration. The calculation is performed by the Titroprocessor on the following titration data:
- E1 = mL of titrant at end point,
- C1 = Factor for converting moles of acid/g. of XAE to mg of KOH/g of XAE,
- C2 = Normality of titrant,
- C3 = Blank titration in mL of titrant at end point, and
- W = Sample weight The equation for the calculation is:

$$AN = \frac{(E1 - C3) \times C2 \times C1}{W}$$

Typical and actual values for these data and the actual AN calculation for an XAE sample is as follows:

$$AN = \frac{\overset{E1}{(3.171)} - \overset{C3}{0.0}) \times \overset{C2}{(0.1090)} \times \overset{C1}{(56.100)}}{\underset{w}{0.8181}} = 23.70;$$

This acid number corresponds to 1.90 weight percent total carboxyl group content in the XAE sample calculated as follows:

$$\text{Wt. \% COOH} = \frac{45 \text{ g/mole COOH} \times 100\% \times AN}{56100 \text{ mg/mole } KOH} =$$

-continued $$(0.0802) \times 23.70 = 1.90$$

The weight % of nonsaponifiable backbone carboxyl groups (BBC) is determined by (1) strong base saponification of the carboxylated cellulose ester to eliminate extra-pendant carboxyl groups which may be formed, for example, on the alkyl moieties of the pendant ester groups (2) reacidification to neutrality, (3) neutralization of the backbone carboxyl groups with barium o-nitrophenolate, (4) analysis for barium content, and (5) calculation of backbone carboxyl content therefrom. An example of this procedure is as follows:

Preparation of Barium o-Nitrophenolate (Reagent A) Stock Solution

Heat 3 liters of distilled water in a 4 liter flask to 75° C. on a steam bath. Add 16.67 g of barium hydroxide [Ba(OH)$_2$.H$_2$O] and 21.67 g of o-nitrophenol. Stir vigorously for 1 hour at 75° C. and let stand overnight at room temperature. Decant to another flask, heat to 75° C., add 4.17 g of o-nitrophenol, stir and let stand overnight at room temperature. Decant and filter on a Buchner funnel through Whatman No. 4 paper and adjust the filtrate to 3 liters with distilled water.

Saponification of XAE

100 Grams of XAE is dissolved in 300 g of methanol and added to 1.0 kg of 5 weight percent aqueous NaOH dropwise with stirring over a 2-hour period at room temperature. The resulting suspended precipitate is stirred for 18 hours at room temperature, the precipitate washed to neutrality on a fritted Buchner funnel with deionized water, and the water pulled off from the precipitate to form a cake.

Reacidification

The cake is suspended in 1.0 liter of 0.1N aqueous HCl at room temperature for 4 hours, the solids collected on a Buchner funnel, washed to neutrality with deionized water, the water pulled off from the solids to form a cake, and the cake crushed in an evaporating dish and dried in a convection oven at 50° C. for 18 hours.

Neutralization of BBC

Place 1 to 2 grams of the crushed reacidified cake, measured to the nearest 0.01 g in a clean 32-oz. wide-mouth jar to provide the experimental sample. An equal amount of Avicell PH101 microcrystalline cellulose is put in a second clean 32-oz. wide-mouth jar to provide the control sample. To each sample jar is added 600 mL of deionized water and 50 g of Reagent A, the closed jars rolled at room temperature for 24 hours, and the suspensions filtered into clean, dry 125 mL filter flasks.

Analysis for Barium (Ba)

The filtrate of each sample is analyzed for Ba by inductively coupled plasma-optical emission spectroscopy using a Perkin-Elmer ICP/5500 spectrometer.

Calculation of BBC

Weight percent of backbone carboxyl groups for each sample based on the sample weight is calculated from the equation:

$$BBC = (4.26 \times 10^{-2}) \frac{(Ba_c - Ba_x)}{S}$$

where
- $Ba_c$ is the concentration (ppm) of Ba in the control sample filtrate;
- $Ba_x$ is the concentration (ppm) of Ba in the experimental sample filtrate; and
- S is the sample weight in grams.

The following is an exemplary calculation wherein:
$Ba_c = 183$ ppm,
$Ba_x = 136$ ppm, and
$S = 2.00$ g $$BBC = (4.26 \times 10^{-2}) \frac{(183 - 136)}{2.00} = 1.00 \text{ Wt. \%}$$

The minimum % of backbone carboxyl in a sample is calculated as:

$$\left[ \frac{BBC}{\dfrac{100 \times \text{Total COOH}}{\left(100 - W_a + \dfrac{W_a}{MW_a} - W_o + \dfrac{W_o}{MW_o} - W_\beta + \dfrac{W_\beta}{MW_\beta}\right)}} \right] \times 100\%$$

where:
- BBC is the weight percent of backbone carboxyl group as calculated above;
- total COOH is the weight percent COOH calculated from the acid number obtained by weak base titration;
- $W_a$ is the weight percent acetyl;
- $MW_a$ is the molecular weight of the acetyl moiety = 43 g/mole of acetyl;
- $W_o$ is the weight percent propionyl;
- $MW_o$ is the weight percent propionyl;
- ty = 57 g/mole of propionyl;
- $W_\beta$ is the weight percent butyryl; and
- $MW_\beta$ = is the molecular weight of the butyryl moiety = 71 g/mole of butyryl.

Since the total COOH in this example is 1.9% (data given above) and the weight percent BBC is 1.00, the minimum percent of backbone carboxyl in the sample is equal to:

$$\left[ \frac{1.00 \times 100\%}{\dfrac{100 \times 1.9}{\left(100 - 11 + \dfrac{11}{43} - 0.2 + \dfrac{0.2}{57} - 33 + \dfrac{33}{71}\right)}} \right] = 30\%$$

The conversion factor $4.26 \times 10^{-2}$ employed in the above calculation is derived as follows:

$$\frac{2 \times 45 \text{ g/mole (COOH)} \times 0.65 \ 1 \times 1000 \ mL/1 \times 10^{-6} \ (\text{ppm})^{-1} \times 100\%}{137.3 \text{ g/mole } Ba} = 4.26 \times 10^{-2}$$

The peroxide $(O-O)$ values or functionality of the preferred XAE can reside in the polymer at more than one possible location and in different chemical associations with the XAE rings and pendant groups. The essential aspect is that the peroxide values represent actual $(O-O)$ functionality, that they be measurable as such by techniques known in the art, and that they be useful, for example, in the free-radical initiation of curable coatings into which the XAE is compounded.

A typical species of anhydroglucose unit residue in which $(O-O)$ moieties are found, as evidenced by polarography has the structure:

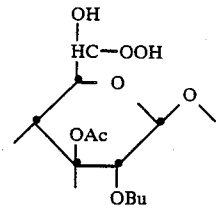

These peroxide groups in general in the XAE are considered quite stable by comparison, e.g., to t-butyl peroxypivalate, a commercially available free radical initiator which decomposes exothermically upon heat initiation. The present XAE, on the other hand, retains substantial peroxide functionality. These moieties are formed during ozonolysis. This phenomenon does not occur in other reactions of cellulosics such as carboxylation thereof by esterification, as in making cellulose acetate phthalate, or by etherification, as in making carboxymethyl cellulose, and no useful peroxide values appear to result from those processes. For those cellulosics carboxylated by peroxide-initiated grafting, any peroxide introduced is apparently destroyed in the grafting process.

In the present invention, the molar ratio of total peroxide, $(O-O)$, to total carboxylic acid, COOH, is approximately 2.2 for XAE in the acid number range from 5 to 50, prior to any post-ozonolytic processing. Treatment of XAE, other than storage at low temperature, may alter the peroxide level through decomposition thereof. The post-ozonolytic treatments of the present invention, however, will not take this ratio to less than 1 so that the finished XAE will have an equivalent ratio of peroxide to carboxylic acid of greater than 1 and less than or equal to approximately 2.2.

The peroxide values in meq. of $(O-O)$ per gram of XAE are determined by reacting an excess of sodium iodide with the XAE sample in 1/1 by weight, acetic acid/methylene chloride for 30 minutes. Water is added and the liberated iodine is titrated with sodium thiosulfate to a starch end point. The equation for the calculation is:

$$\text{Peroxide Value} = \frac{(S - B) \times N}{W} \text{ wherein:}$$

- S = mL $Na_2SO_2O_3$ used to titrate sample;
- B = mL $Na_2SO_2O_3$ used to titrate blank;
- N = Normality of the $Na_2SO_2O_3$; and
- W = Sample weight in grams.

The lactone moiety formation is unique to the present cellulose ester carboxylation and these moieties are contained in anhydroglucose residue units of the structures typified for example, by:

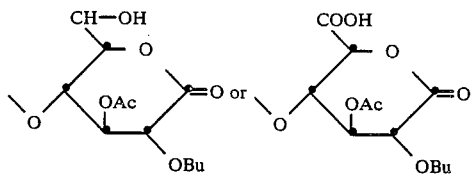

resulting from chain cleavage during ozonolysis and/or viscosity reduction. The lactone content is determined by subtracting the total carboxyl content of an XAE sample determined by weak base (Brinkmann) titration from the total carboxyl content of the same sample determined by strong base titration. The strong base opens the lactone by hydrolysis to give the —COO— anion. The weak base titration is described in detail above. The strong base titration is as follows:

An XAE sample weighing from 0.25 g to 0.60 g measured to the nearest (0.005 g) on a Mettler PC 4400 balance is added to 150 g±1 g of a solvent consisting of 90 weight percent methylene chloride and 10 weight percent methanol, and allowed to dissolve at room temperature with magnetic stirring. The solution is made 5±2 micromolar in phenolphthalein and titrated with an ethanolic KOH solution having a normality known to the nearest 0.001N in the range of 0.1N±0.01N. The titration is performed by adding the titrant dropwise from a 25 mL buret (Labglass, Inc.) to the solution being magnetically stirred at room temperature until a pink endpoint is obtained. The volume of titrant is measured to the nearest 0.05 mL and the acid number AN is calculated from the equation:

$$AN = \frac{N \times mL \times 56.1 \text{ g/mole } KOH}{W}$$

where
N = Normality of KOH,
mL = mL of Titrant, and
W = Weight of XAE Sample in Grams.

A typical lactone level in moles of lactone moiety per gram of XAE in calculated as follows;
L = Moles of Lactone Moiety Per Gram of XAE, $$L = \frac{\Delta AN}{56100 \text{ mg/Mole } KOH} \text{ and}$$

wherein $\Delta AN$ = (AN by strong base titration) — (AN by weak base titration).

Example calculation
AN by strong base titration 22.1
AN by weak base titration 13.3

$$L = \frac{(22.1 - 13.3)}{56100} = 1.57 \times 10^{-4}$$

The XAE material has unusual reduction in solution viscosity with time as determined by the Hoeppler method defined below and given the designation herein of HVR, as previously mentioned. Typically, within the range of initial Hoeppler viscosity in centipoises (cps) of from about 20 to about 20,000 cps, a decrease in viscosity of the XAE solution in n-butylacetate/n-butyl alcohol, 85/15, weight/weight to 65%–95% of the initial value normally occurs in about 24 hours at 80° C. This phenomenon is highly unusual since other cellulose esters experience little if any decrease in such viscosity, and usually show a slight increase with the passage of time. For the present XAE material in general, an initial Hoeppler viscosity of from about 10 to about 200 centipoises is preferred.

The Hoeppler viscosity method is based on the principle that viscosity may be measured by the time required for a standardized ball to roll down an inclined tube filled with the cellulose ester solution. The ball size is selected according to the initial viscosity to require sufficient time for it to pass between two reference marks for accuracy; not less than 20 nor more than 300 seconds. The larger the ball, the greater is the time required.

The Hoeppler Viscometer or Haake Falling-Ball Viscometer is distributed by several laboratory supply houses including PolyScience Corporation, 909 Pitner Avenue, Evanston, Ill. It consists of a precision bore glass tube approximately 1 inch in internal diameter and 8½ inches in length with brass fittings and rubber gaskets on each end for stoppers, and a dropping funnel in the top. Reference marks are 10 cm apart in the mid-section. This tube is mounted in a glass water jacket approximately 3¼ inches in diameter and 7½ inches in length. The jacket is provided with a thermometer so placed that it may be read in the water, and is also provided with inlet and outlet fittings for circulating constant temperature water through the jacket and around the tube. The jacket and tube are mounted on a rigid frame fastened to a base provided with leveling screws and a leveling device so that when the base is level, the jacket and tube are inclined at exactly fifteen degrees.

The instrument is equipped with several standardized balls, some glass, some gold plated, and some steel. The balls vary in size and specific gravity and cover a wide range of viscosities, the glass balls having a low specific gravity and being used for very low viscosity liquids. The gold-plated balls and larger steel balls are for higher viscosity liquids, and the smaller steel balls for still higher viscosity liquids. Each ball has been accurately standardized with a constant "K" for the tube by the manufacturer. This constant and the factors in the following formula are used in the conversion of seconds to centipoises.

The Hoeppler viscosity N in centipoises (cps) is determined for the present XAE using a 20% by weight solution of the XAE sample in a solvent consisting of an 85/15 weight ratio of n-butyl acetate/n-butyl alcohol, and is calculated from the equation $$N = T(S-D)K$$

wherein:
T = Time in Seconds for the Ball to Pass Between the Reference Marks in the Sample;
S = Specific Gravity of Ball Used;
D = Density of XAE Sample Solution at Temperature of Determination; and
K = Tube Constant for the Particular Ball Used.

The actual K value for the steel ball used in determining the Hoeppler viscosity of the XAE samples given below was determined using S-60 oil of known viscosity (101.1 cps). The ball had a weight of 16.238 g, a density of 8.146, and a micrometer measured diameter of 1.562 cm. The calculation of K according to the above equation was as follows:

```
  N       T       S       D
101.1 = 185.6(8.146 = 0.8638)A
```

-continued
A = 0.0748

General Process for Preparing Carboxylated Cellulose Esters

Cellulose esters are reacted with ozone to yield the carboxylated cellulose ester product. The cellulose esters which are useful as starting materials useful for preparation of esters useful in the present invention are well known, as also are methods for their production and the methods for analyzing for acetyl, butyryl, and propionyl content, for degree of polymerization (DP) and for viscosity determinations. See, for example, Kirk-Othmer Encyclopedia of Chemical Technology, 3rd Ed., Vol. 5 pages 118–143. Specific cellulose esters which are useful to prepare esters useful in the present invention include cellulose acetate, cellulose propionate, cellulose butyrate, cellulose acetate butyrate, cellulose acetate propionate, mixtures thereof, etc. Especially preferred as a starting material for the esters useful in the present invention are cellulose acetate butyrate and cellulose acetate propionate.

The cellulose ester starting material is provided to a reaction zone in a form which is suitable for reaction with ozone. For instance, it is possible to provide the cellulose ester in the form of a solution in a appropriate solvent. The solvent for such a solution should be one in which both the cellulose ester starting material and the carboxylated cellulose ester product are soluble. The solvent also should be substantially unreactive with ozone. A wide variety of materials meets these criteria. Among the most inexpensive and readily available of the suitable solvents are the lower alkanoic acids and the lower alkyl ketones. A nonexclusive list of suitable solvents includes formic acid, acetic acid, acetone, methyl ethyl ketone, methyl propyl ketone, methyl isobutyl ketone, methyl amyl ketone, etc. Higher acids, such as propionic and butyric acids, are reactive with ozone, yielding lower acids. Because the ultimate lower acids are suitable solvents, these higher acids may also be employed as solvents in the present process, but are less preferred than the lower acids.

It is also contemplated that the cellulose ester starting material may be provided in the form of an aqueous slurry. However, reaction between ozone and cellulose ester may be somewhat more difficult to accomplish in such a system due to the low solubility of ozone in water.

The solvent and slurry systems described above offer the advantage of obviating the necessity of drying the cellulose ester starting material prior to reaction with ozone. However, following the reaction, the carboxylated product commonly is separated from the solvent or slurry system by evaporation, drying, etc. Therefore, the solution or slurry prior to reaction is preferably relatively concentrated in order to facilitate recovery of the product. However, the concentration of the slurry or solution is not critical and may be varied within wide limits, from very dilute to very concentrated, depending upon such factors as the nature of the solvent, the rate of agitation during the reaction, the degree of contact between the cellulose ester and the ozone, and other considerations which will be apparent to the person of ordinary skill in the art. Typically, however, a solids content of about 20% to 25% by weight being preferred.

Preferably, however, the cellulose ester starting material is provided in a solid particulate form. For example, the cellulose ester can be provided as pellets, granules, poweders, or any other convenient particulate form. In preferred embodiments, the cellulose ester is provided in the form of a powder.

In those embodiments wherein a solid cellulose ester is employed, the cellulose ester starting materials preferably have a moisture content no greater than about 5.0% by weight. At higher moisture levels (e.g., greater than about 25% by weight), the cellulose ester particles tend to clump together and longer reaction times are necessary in order to obtain a desirable product. It is not necessary to expend effort or resources in order to achieve a moisture content less than about 15 weight percent, the efficiency of the oxidation reaction not being measurably affected thereby. However, fluidization of a cellulose ester powder (as discussed below) is most facile at moisture levels less than about 5% by weight (e.g., 2% or less).

In the reaction zone, the cellulose ester is intimately contacted with a gaseous stream comprising ozone. The ozone can be generated from a source of molecular oxygen or from air by the use of any commercial ozone generator. The intimate contacting can be accomplished by any means which provides relatively rapid complete, and uniform reaction between the cellulose ester and the ozone. For example, it is contemplated that the cellulose ester be agitated in the reactor while a gaseous stream containing ozone is passed through the reactor. Alternately, in those especially preferred embodiments wherein the cellulose ester is present in the form of a powder, it is desirable to pass the gaseous stream containing ozone through a distributor plate and through the cellulose ester powder so as to create a fluidized solid.

The gaseous stream which is pass through the cellulose ester preferably comprises at least about 0.25 weight percent ozone, based upon the total weight of gas present in the reaction system. Preferably, the ozone is present in a concentration of about 0.5 to 4 percent by weight (e.g., about 1% to 3%). Higher ozone concentrations (e.g., as high as 7% or higher) are of course, effective, but are increasingly uneconomical. The gaseous stream in addition to ozone further comprises air, oxygen, and/or inert diluent gas, such as nitrogen. In preferred embodiments, the gaseous stream comprises at least about 90% inert diluent (about 50% $N_2$ and about 40% from air) and about 1.5% to 2% ozone, the remainder comprising $O_2$, $CO_2$, and other components of air.

It will be apparent that there is an inverse relationship between ozone concentration and time of reaction, all other factors being constant. That is, as the concentration of ozone in the gas stream decreases, the time of reaction increases (ultimately, to uneconomically long periods of time).

It is believed that ozone partial pressure has an advantageous effect on rate of reaction. That is, as the partial pressure of ozone increases, the rate of reaction is believed to also increase. While the use of atmospheric pressure is preferred, it is conceivable that superatmospheric total pressures can also be employed. For a given ozone concentration, the partial pressure of ozone (and, therefore, the rate of reaction) is higher at superatmospheric pressures than at atmospheric pressure. Therefore, it may be possible to employ superatmospheric pressures and lower ozone concentrations to achieve a desired rate of reaction.

The cellulose ester is reacted with the ozone which is present in the gaseous stream. The reaction is conducted at a temperature of about 25°–80° C. (preferably, about 50°–75° C.). At reaction temperatures much about 75° C., the polymer particles may begin to stick together, thereby forming clumps, and the oxidation reaction is no longer homogeneous. Furthermore, the acids (such as acetic, propionic, and/or butyric) which are liberated during the ozone oxidation function as plasticizers for the cellulose ester starting material. The glass transition temperature of the reacting cellulosic material is thereby reduced, giving rise to additional polymer clumping problems at higher reaction temperatures.

The cellulose ester is reacted with the ozone for a period of time sufficient to yield a carboxylated cellulose ester product. Typically, desirable carboxylated cellulose ester products will have an acid number of at least about 5. Of course, the time of reaction required to obtain desirable products depends upon such factors as temperature, the concentration of ozone in the gas stream, etc. Commonly, desirable products are obtained by reacting the cellulose ester starting material with ozone for a period of time of at least about 0.5 hour. In preferred embodiments, the reaction is conducted for a period of time of about 0.5 to 24 hours (e.g., about 1 to 12 hours).

After the specified reaction time, the carboxylated cellulose ester product is removed from the reactor, separated from solvent (if employed), and purged free of the liberated aliphatic carboxylic acids by any convenient method. Commonly employed means include stripping the product under reduced pressure, heating the product in a forced-air oven, washing the product with water or mixtures of water with lower alkanols (such as methanol, ethanol, or i-propanol), etc. Alternatively, especially in embodiments wherein the reaction is conducted using solid particulate cellulose ester, the product can be purged of residual acid by-products in the reaction apparatus by passing a hot, inert purge gas (e.g., nitrogen) through the carboxylated cellulose ester product until it is free of residual acids.

Acrylate Monomer

The acrylate monomers useful in the anaerobic adhesive compositions of the present inventions are unsaturated mono-, di-, or triacrylate monomers. Such monomers are known in the art and are disclosed in, for example, U.S. Pat. Nos. 2,628,178; 2,895,950; 3,041,322; 3,043,820; 3,218,305; 3,457,212; 3,923,737; 3,944,521 and 4,038,465. Preferred acrylate monomers are acrylic acid, methacrylic acid, hydroxyethyl methacrylate, hydroxypropy methacrylate, methyl methacrylate, trimethylol propane trimethacrylate, and poly glycol dimethacrylate.

The acrylate monomer or combination of acrylate monomers must be such that it is able to dissolve the carboxylated cellulose ester to a concentration of carboxylated cellulose ester in solution of at least 3 weight percent of the total weight of acrylate plus carboxylated cellulose ester. If such a level is not dissolved, then the adhesive will not sufficiently cure to achieve an adequate bond. It is preferred that the acrylate be able to dissolve the carboxylated cellulose ester to a concentration of carboxylated cellulose ester in solution of at least 9% of the total weight of acrylate plus carboxylated cellulose ester.

When acrylate monomers are used that have an amine functionality (e.g., when X is $NR^3$), then the amount of such amine-containing monomer(s) must be present at a molar level less than the sum of the total moles of carboxyl groups from the carboxylated cellulose ester and twice the total molar equivalent of peroxide content of the cellulose ester. If such amine-containing monomers are present at a greater concentration, then the adhesive formulation will be unsatisfactory.

When acrylate monomers are used that have a phenyl functionality (e.g., when $R^1$ is phenyl), then the amount of such phenyl-containing monomer(s) must be present at a level equimolar or less, relative to the total of the nonphenyl-containing monomers. If such phenyl-containing monomers are present at a greater concentration, then the adhesive formulation will be unsatisfactory. It is preferred that such phenyl-containing acrylate monomers are no greater than 12 weight percent of the total acrylate monomers (i.e., nonphenyl-containing plus phenyl-containing).

Hydroquinone-Based Stabilizer

The hydroquinone-based stabilizers useful in the anaerobic adhesive of the present invention are also known in the art and are described in, for example, U.S. Pat. Nos. 3,435,012 and 3,591,438.

Preferred hydroquinone-based stabilizers are hydroquinone, hydroquinone monomethyl ether, 2,5-di-tertiary-butyl hydroquinone, tertiary-butyl hydroquinone, 2-tertiary butyl hydroquinone, and 2-octyl hydroquinone.

Accelerator

The anaerobic adhesive compositions of the present invention may optionally contain an accelerator. Suitable accelerators are, for example, at least one accelerator selected from:
(i) not greater than about 140 ppm, based on the weight of components (A) and (B), of cobalt ions that are soluble in component (B),
(ii) not greater than about 50 ppm, based on the weight of components (A) and (B), of vanadium ions that are soluble in component (B), and
(iii) not greater than about 5 weight percent, based on the weight of components (A) and (B), of at least one tertiary amine having the formula:

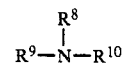

wherein
each $R^8$, independently, is a straight-chain, branched or alicyclic alkyl radical of 1 to 8 carbon atoms,
$R^9$ is a straight-chain, branched or alicyclic alkyl radical of 1 to 8 carbon atoms, and
$R^{10}$ is phenyl, benzyl, or a straight-chain branched or alicyclic alkyl radical of 2 to 8 carbon atoms.

The accelerators are known in the art as disclosed in, for example, U.S. Pat. Nos. 3,435,012; 4,373,077; and 3,890,407. Preferred accelerators are tertiary amines. Preferred is that $R^8$ and $R^9$ are independently methyl or ethyl; and that $R^{10}$ is phenyl or benzyl.

It is not desired to be bound by any particular theory or mechanism, but it is believed that cure of the adhesives of the present invention occurs when the peroxide moieties on the carboxylated cellulose esters decompose to a peroxy radical which initiates polymerization. In the presence of atmospheric oxygen, the hydroquinone-based stabilizer reacts with the peroxy radical; thereby preventing the initiation of polymerization of the acrylate monomer(s).

Typically, the usefulness and relative effectiveness of anaerobic adhesives is measured by the torque required to remove a nut from a bolt to which adhesive was applied and allowed to cure. A torque of at least about 1.5–2.0 foot-pounds (ft-lbs) is generally required of a useful adhesive. Therefore, the expression, "an effective adhesive bond" refers a torque requirement of at least about 1.5 ft-lbs as measured in this nut and bolt adhesive test.

One limitation of anaerobic adhesive formulations generally is the difficulty in achieving rapid cure rates and adequate stability during storage. The rate of cure will depend on the amount and type of carboxylated cellulose ester, the amount and type of acrylate species, the amount and type of hydroquinone-derived stabilizer and, if applicable, the amount and type of accelerator. Alterations in the formulation to achieve rapid cure tend to diminish the stability of the adhesive during storage. This may be overcome to some extent by formulating two-package formulations with carboxylated cellulose ester in the first component of the package and the accelerator in the second component. Therefore, such two-package formulations are also within the scope of the present invention.

A preferred embodiment of the present invention comprises a two-package formulation wherein the first package comprises at least one acrylate monomer, at least one stabilizer, and at least one carboxylated cellulose ester, and the second package comprises at least one acrylate monomer, at least one stabilizer, and at least one accelerator.

The anaerobic adhesive composition of the present invention are typically used under ambient conditions, for example at a temperature of from about 31 5° C. to about 35° C., preferred is from about 20° C. to about 25° C. However, thermal control of the curing process through elevation or reduction of temperature beyond ambient ranges is also possible.

The composition of the substrates that can be bonded together by the anaerobic adhesive compositions of the present invention include metal, glass, ceramic, wood, plastic, and the like.

The following examples are to illustrate the invention but should not be interpreted as a limitation thereon.

EXAMPLES 1–5

Procedures for Producing Carboxylated Cellulose Esters (Examples 1–5) in a Glass Reactor In a manner similar to that described in U.S. Pat. No. 4,590,265, the cellulose ester powder was placed in a glass vessel fitted at the bottom with a porous glass frit and adapted with a mechanical stirrer to agitate the powder. The powder was treated with oxygen which contained ozone by passing the gas through the frit to contact the agitated powder. The gas stream was regulated at 7 to 8 SCFH. The gas stream was composed of 1.8 to 2.2 weight percent ozone based on the total weight of the gas with the remainder being oxygen. The glass vessel was maintained at 60° C. to 70° C. After the respective reaction times (Table 1), the product was isolated and placed in a circulating air oven at 55° C. to 65° C. for 20 to 24 hours. The products were characterized by acid number, I.V. and peroxide content.

TABLE 1

Carboxylated Cellulose Esters Used in Anaerobic Adhesives

| Ex. No. | Type of Starting Cellulose Ester | Reaction Time (Hrs.) | Acid Number | I.V. | Peroxide Content |
|---|---|---|---|---|---|
| 1 | Cellulose Acetate | 3.8 | 33.4 | 0.10 | 1.2 |
| 2 | Cellulose Acetate Butyrate | 0.75 | 4.9 | 0.41 | 0.20 |
| 3 | Cellulose Acetate Butyrate | 5.25 | 48.7 | 0.08 | 1.3 |
| 4 | Cellulose Acetate Propionate | 0.75 | 4.9 | 0.43 | 0.20 |
| 5 | Cellulose Acetate | 6.75 | 49.0 | 0.07 | 1.3 |

EXAMPLES 6–9

Procedures for Producing Carboxylated Cellulose Esters (Examples 6–9) in a Steel Reactor The reactor used was similar to the design illustrated in FIG. 1 of the U.S. Pat. No. 4,590,265. The reactor consisted of a jacketed cylindrical chamber which had an internal diameter of 1.5 feet and an internal height of 9.0 feet. An ozone-containing gas stream was introduced into the reactor through the bottom plate constructed of metal felt which supported the bed of cellulose ester and the gas stream then contacted the cellulose ester. The ozone was generated with commercially available air-preparation and ozone-generation units. Unreacted ozone was destroyed as it left the reactor with a commercially available ozone destructor. The reactor was equipped with a piping and a blower capable of taking gas from the top of the reactor and blowing it beneath the bottom plate to be passed through the bed of cellulose ester. A vaporizer was located in this cycling system that was capable of introducing vapors of acetic acid in this cycling gas.

The vessel was maintained from 75° C. to 85° C. by a jacket. The reactor was charged with 300 pounds of cellulose ester powder. A gas stream composed of 1.0 to 1.3 weight percent ozone and 10 to 12 weight percent oxygen with the remainder being nitrogen was passed through the bottom plate at 33 to 37 SCFH for the various times given in Table 2. After this period of ozonolysis, a gas stream which contained no ozone was maintained at the above flow rate by a blower and 500 grams of acetic acid was vaporized from a vaporizer into the reactor.

After the acetic acid was vaporized into the reactor, the reactor, while still 75° to 85° C., was purged with a stream of nitrogen for 4 to 6 hours. The reactor was then cooled to 20° to 25° C. and the product was isolated.

TABLE 2

Carboxylated Cellulose Esters Used in Anaerobic Adhesives

| Ex. No. | Type of Starting Cellulose Ester | Reaction Time (Hrs.) | Acid Number | I.V. | Peroxide Content |
|---|---|---|---|---|---|
| 6 | Cellulose | 6 | 12.6 | 0.30 | 0.22 |

TABLE 2-continued

Carboxylated Cellulose Esters Used in Anaerobic Adhesives

| Ex. No. | Type of Starting Cellulose Ester | Reaction Time (Hrs.) | Acid Number | I.V. | Peroxide Content |
|---|---|---|---|---|---|
| 7 | Acetate Butyrate Cellulose Acetate Butyrate | 11 | 20.4 | 0.15 | 0.51 |
| 8 | Cellulose Acetate Propionate | 6 | 11.6 | 0.23 | 0.35 |
| 9 | Cellulose Acetate Propionate | 11 | 24.3 | 0.12 | 0.63 |

EXAMPLE 10

An Anaerobic Adhesive Formulated Without Accelerator

Carboxylated cellulose ester of Example 6 was used. 45 Grams of this batch of ester was added to 105 g of hydroxyethylmethylacrylate that contained 40 ppm of hydroquinone monomethyl ether and was stirred in until a homogeneous solution resulted. Then 20 g of the above solution was diluted with 30 g of hydroxyethylmethacrylate that also contained 40 ppm of hydroquinone monomethyl ether to produce Solution A. The threads of a 1"×⅜" high carbon steel bolt were coated with A and the corresponding nut was threaded over the coated portion of the bolt. The adhesive was allowed to cure for 24 hours at room temperature under ambient conditions. The torque required to remove the nut from the bolt after 24 hours was measured by clamping the head of the bolt in a vice and removing the nut with a Craftsman ® torque wrench. The average torque required for the four bonds tested was 11 ft-lbs.

EXAMPLE 11

An Anaerobic Adhesive Formulated with an Amine as an Accelerator

A 12 weight percent Solution (B) of carboxylated cellulose ester in hydroxyethylmethacrylate was made by dissolving 89.9 g carboxylated cellulose ester of Example 6 in 659 g of hydroxyethylmethacrylate that contained 40 ppm of hydroquinone monomethyl ether. Then 0.6 g of N,N-dimethyltoluidine was added to 19.4 g of B. The threads of a 1"×⅜" 316 stainless steel bolt were coated with this amine accelerated formulation. The corresponding nut was threaded over the coated bolt and the bond strength tested as in Example 10. The average torque required for the five bonds tested was 10 ft-lbs.

EXAMPLE 12

An Anaerobic Adhesive Formulated with a Triacrylate Monomer

A 10 weight percent Solution (C) of carboxylated cellulose ester of Example 6 in trimethylolpropane trimethylacrylate was made by dissolving 10 g of ester, in 90 g of trimethylolpropane trimethacrylate that contained 40 ppm of hydroquinone monomethyl ether. The adhesive formulation was made by mixing 95 g of B, (Example 11) 5 g of C and 1 g of N,N-dimethyltoluidine. The adhesive was tested on aluminum slides that were 1" wide and had been roughed with 240 grit sandpaper. Both surfaces to be bonded were coated with adhesive and the surfaces were mated so as to have a 1" overlap. The bonds were tested after 24 hours of curing by ASTM Method D-1002 with an instron crosshead speed of 0.5 inches per minute. The average lap-shear bond strength of the five bonds tested was 520 psi.

EXAMPLE 13

An Anaerobic Adhesive Formulated with Colbalt as an Accelerator

A 0.6 weight percent Solution (D) of cobalt in hydroxyethylmethacrylate was made by adding 0.5 g of 6% Cobalt Hex-Cem TM to 4.5 g of hydroxyethylmethacrylate. This formulation was made by mixing 48.8 g of B (Example 11) with 1.2 g of D. This formulation was tested on high carbon steel bolts as described in Example 10 and on 316 stainless steel bolts as described in Example 11. The average torque required to remove nuts from both types of bolts was 14 ft-lbs.

EXAMPLE 14

An Anaerobic Adhesive Formulated with Vanadium as an Accelerator

Sufficient 4% Vanadium Hex-Cem TM was added to 50 g of C (Example 12) to make it 50 ppm in vanadium. This vanadium accelerated formulation was tested on high carbon steel bolts and 316 stainless steel bolts as described in Example 13. The average torque required to remove nuts from both types of bolts was 14 ft-lbs.

EXAMPLE 15

A Two-Package Anaerobic Adhesive Formulated with Carboxylated Cellulose Ester

A 10 weight percent solution (E) of carboxylated cellulose ester of Example 7 in methylmethacrylate was made by dissolving 10 g of such ester in 90 g of methylmethacrylate that contained 20 ppm hydroquinone monomethyl ether. A 20 weight percent solution (F) of carboxylated cellulose ester of Example 7 in acrylic acid was made by dissolving 20 g of such ester in 80 g of acrylic acid that contained 200 ppm of hydroquinone monomethyl ether. The first component (1) of the anaerobic adhesive formulation was made by adding sufficient 6% Cobalt Hex-Cem TM to E to make the concentration of cobalt in 1 100 ppm. The second component of the Formulation (2) was made by mixing 40 g of B with 5 g of C (Example 12) and 5 g of F. This adhesive was tested on aluminum slides in a manner similar to Example 12 except that one of the surfaces to be mated was coated with 1 and the opposite surface was coated with 2. The bonds were tested as described in Example 12. The average lap-shear bond strength of the five bonds tested was 940 psi.

EXAMPLE 16

An Anaerobic Adhesive Formulated Such that the Eastacel is not Dissolved (Comparative Example)

A 10 weight percent mixture of carboxylated ester of Example 6 in 2-ethylhexylmethacrylate was made by adding 10 g of ester to 90 g of 2-ethylhexylmethacrylate that cintained 20 ppm hydroquinone monomethyl ether. The ester did not dissolve in this monomer at room temperature. The treads of 1"×⅜" high carbon steel bolts were coated with this mixture and bonds to nuts were tested as described in Example 10. After 24 hours of cure, no bond strength was detected.

EXAMPLE 17

An Anaerobic Adhesive Formulated with Eastacel and with N,N-Dimethylaminoethylmethacrylate as the Only Acrylate Monomer (Comparative Example)

A 10 weight percent solution of carboxylated cellulose ester of Example 7 in N,N-dimethylaminoethylmethacrylate was made by dissolving 10 g of ester in 90 g of N,N-dimethylaminoethylmethacryate which contained 50 ppm hydroquinone monomethyl ether. Sufficient 4% Vanadium Hex-Cem TM was added to make the concentration of vanadium in this solution of Eastacel 50 ppm. The threads of 1"×⅜" high carbon steel bolts were coated with this vanadium accelerated formulation and bond strengths were tested as described in Example 10. This formulation had no detectable bond strength.

EXAMPLE 18

An Anaerobic Adhesive Formulated with the Carboxylated Cellulose Ester at a Concentration of 3 Weight Percent of the Formulation

A 3 weight percent solution of carboxylated cellulose ester was made by diluting 1 g of Solution B of Example 11 with 3 g of hydroxyethyl methacrylate that contained 40 ppm of hydroquinone monomethyl ether. This formulation was tested on high carbon steel bolts as described in Example 10. The average torque required to break the five bonds tested was 7 ft-lbs.

EXAMPLE 19

An Anaerobic Adhesive Formulated with the Carboxylated Cellulose Ester at a Concentration of 30 Weight Percent of the Formulation

A 30 weight percent solution of carboxylated cellulose ester was made by dissolving 45 g of carboxylated cellulose ester from the same lot as that used in Example 10 in 105 g of hydroxyethyl methacrylate that contained 40 ppm hydroquinone monomethyl ether. An aliquot of 9.4 g of this solution was taken and sufficient vanadium(III)acetylacetonate was added to make the final vanadium concentration 10 ppm. This formulation was tested on high carbon steel bolts. The average torque required for the five bonds was 18 ft-lbs.

EXAMPLE 20

An Anaerobic Adhesive Formulated with Carboxylated Cellulose Ester that had an Acid Number of Five

Carboxylated cellulose ester was made from cellulose acetate butyrate to an acid number of 4.9 (Example 2). Then 10 g of this carboxylated cellulose ester were dissolved in 87 g of hydroxyethyl methacrylate that contained 40 ppm hydroquinone monomethyl ether by agitation in a Waring blender. 3 g of N,N-dimethyltoluidine was added to this solution and mixed in the Waring blender. This formulation was tested on high carbon steel bolts as described in Example 10. The average torque required for the four bonds tested was 4 ft-lbs.

EXAMPLE 21

An Anaerobic Adhesive Formulated with Carboxylated Cellulose Ester that had an Acid Number of Fifty

Carboxylated cellulose ester was made from cellulose acetate butyrate to an acid number of 48.7 (Example 3). This carboxylated cellulose ester was formulated into an anaerobic adhesive as described in Example 20 by substituting the carboxylated cellulose ester which had an acid number of 48.7 for the carboxylated cellulose ester which had an acid number of 4.9. This formulation was tested on high carbon steel bolts as described in Example 10. The average torque required for the four bonds tested was 10 ft-lbs.

EXAMPLE 22

An Anaerobic Adhesive Formulated with a Carboxylated Cellulose Ester that had an Acid Number of Fifty and was Made From Cellulose Acetate Propionate

Carboxylated cellulose ester was made from cellulose acetate propionate to an acid number of 49.0 (Example 5). This carboxylated cellulose ester was formulated into an anaerobic adhesive as described in Example 20 by substituting this carboxylated cellulose ester which had an acid number of 49.0 for the carboxylated cellulose ester which had an acid number of 4.9. This formulation was tested on high carbon steel bolts as described in Example 10. The average torque required for the four bonds tested was 8 ft-lbs.

EXAMPLE 23

An Anaerobic Adhesive Formulated with a Carboxylated Cellulose Ester that had an Acid Number of Twenty and was Made from Cellulose Acetate Propionate

Carboxylated cellulose ester was made from cellulose acetate propionate to an acid number of 24.3 (Example 9). This carboxylated cellulose ester was formulated into an anaerobic adhesive as described in Example 20 by substituting this carboxylated cellulose ester which had an acid number of 24.3 for the carboxylated cellulose ester which had an acid number of 4.9. This formulation was tested on high carbon steel bolts as described in Example 10. The average torque required for the four bonds tested was 7 ft-lbs.

EXAMPLE 24

An Anaerobic Adhesive Formulated with a Carboxylated Cellulose Ester that had an Acid Number of Eleven and was Made from Cellulose Acetate Propionate

Carboxylated cellulose ester was made from cellulose acetate propionate to an acid number of 11.6 (Example 8). This carboxylated cellulose ester was formulated into an anaerobic adhesive as described in Example 20 by substituting this carboxylated cellulose ester which had an acid number of 11.6 for the carboxylated cellulose ester which had an acid number of 4.9. This formulation was tested on high carbon steel bolts as described in Example 10. The average torque required for the four bonds tested was 6 ft-lbs.

EXAMPLE 25

An Anaerobic Adhesive Formulated with a Carboxylated Cellulose Ester that had an Acid Number of Five and was Made from Cellulose Acetate Propionate Carboxylated cellulose ester was made from cellulose acetate propionate to an acid number of 4.9 (Example 4). This carboxylated cellulose ester was formulated into an anaerobic adhesive as described in Example 24 by substituting this carboxylated cellulose ester which had an acid number of 4.9 for the carboxylated cellulose ester which had an acid number of 11.6.

This formulation was tested on high carbon steel bolts as described in Example 10. The average torque required for the four bonds tested was 7 ft-lbs.

EXAMPLE 26

An Anaerobic Adhesive Formulated with Carboxylated Cellulose Ester made from Cellulose Acetate Carboxylated cellulose ester was made from cellulose acetate to an acid number of 33.4 (Example 1). This carboxylated cellulose ester was formulated into an anaerobic adhesive by dissolving 1 g of the material in 9 g of hydroxyethyl methacrylate which contained 40 ppm hydroquinone monomethyl ether. This formulation was tested on high carbon steel bolts as described in Example 10. The average torque required for the four bonds tested was 12 ft-lbs.

EXAMPLE 27

An Anaerobic Adhesive Formulated with Carboxylated Cellulose Ester made from Cellulose Acetate Propionate and Having the Level of Hydroquinone-Based Stabilizer at 500 ppm Based on the Weight of the Acrylate Monomer Carboxylated cellulose ester from the same lot as that used in Example 23 was used in this formulation. This ester was dissolved in hydroxyethyl methacrylate that contained 40 ppm hydroquinone monomethyl ether to a final concentration for the carboxylated cellulose ester of 18.2 weight percent. 40 g of this solution was mixed with 50 g of glacial acrylic acid which contained 994 ppm hydroquinone monomethyl ether to give a final concentration of hydroquinone monomethyl ether of 500 ppm based on the weight of the acrylate monomer. This formulation was tested on high carbon steel bolts as described in Example 10. The average torque required for the four bonds tested was 22 ft-lbs.

EXAMPLE 28

An Anaerobic Adhesive Formulated with a Carboxylated Cellulose Ester and Hydroquinone as the Stabilizer of the Acrylate Monomer Methyl methacrylate was cooled in an ice-water bath and extracted with chilled, 10 weight percent, aqueous sodium hydroxide solution in order to remove any hydroquinone monomethyl ether. The methyl methacrylate was dried with anhydrous $MgSO_4$ and passed through a fritted-glass funnel to remove particulate matter. Hydroquinone was added to the extracted methyl methacrylate to bring the final concentration of hydroquinone to 20 ppm based on the weight of the acrylate monomer. Carboxylated cellulose ester, made from cellulose acetate butyrate in an acid number of 20.4 (Example 7) was dissolved in the restabilized methyl methacrylate to a final concentration for the carboxylated cellulose ester of 20 weight percent of the total formulation. Sufficient vandadium(III)naphthonate was added to the solution to make the final formulation 5 ppm in vanadium. This formulation was tested on high carbon steel bolts as described in Example 10. The average torque required for the four bonds tested was 3.5 ft-lbs.

EXAMPLE 29

An Anaerobic Adhesive Formulated with a Carboxylated Cellulose Ester and Tertiary-Butyl Hydroquinone as the Stabilizer An anaerobic adhesive was formulated as described in Example 28 with the substitution of 20 ppm tertiary-butyl hydroquinone for the 20 ppm hydroquinone in the formulation. This formulation was tested on high carbon steel bolts as described in Example 10. The average torque required for the four bonds tested was 2.5 ft-lbs.

EXAMPLE 30

An Anaerobic Adhesive Formulated with a Carboxylated Cellulose Ester and 2,5-Di-Tertiary-Butyl Hydroquinone as the Stabilizer An anaerobic adhesive was formulated as described in Example 28 with the substitution of 20 ppm 2,5-di-tertiary-butyl hydroquinone for the 20 ppm hydroquinone in the formulation. This formulation was tested on high carbon steel bolts as described in Example 10. The average torque required for the four bonds tested was 3 ft-lbs.

EXAMPLE 31

An Anaerobic Adhesive Formulated with a Carboxylated Cellulose Ester and 2-Tertiary-Butyl Hydroquinone Monomethyl ether as the stabilizer An anaerobic adhesive was formulated as described in Example 28 with the substitution of 20 ppm 2-tertiary-butyl hydroquinone monomethyl ether for the 20 ppm hydroquinone in the formulation. This formulation was tested on high carbon steel bolts as described in Example 10. The average torque required for the four bonds tested was 2.5 ft-lbs.

EXAMPLE 32

An Anaerobic Adhesive Formulated with Carboxylated Cellulose Ester and 2-Octyl Hydroquinone as the Stabilizer of the Acrylate Monomer An anaerobic adhesive was formulated as described in Example 28 with the substitution of 20 ppm 2-octyl hydroquinone for the 20 ppm hydroquinone in the formulation. This formulation was tested on high carbon steel bolts as described in Example 10. The average torque required for the four bonds tested was 8 ft-lbs.

EXAMPLE 33

An Anaerobic Adhesive Formulated with a Carboxylated Cellulose Ester and an Acrylate Monomer having $R^1$ being a Phenyl Group as Detailed in the Description Section Carboxylated cellulose ester from the same lot as that used in Example 28 was used in this formulation. This was dissolved in hydroxyethyl methacrylate, which contained 40 ppm of hydroquinone monomethyl ether, such that the final concentration for the carboxylated cellulose ester was 30 weight percent of the solution. Then 2.0 g of this solution was mixed with 1.74 g of phenyl acrylate which contained 200 ppm hydroquinone monomethyl ether. This formulation was tested on high carbon steel bolts as described in Example 10. The average torque required for the four bonds tested was 4 ft-lbs.

EXAMPLE 34

An Anaerobic Adhesive Formulated with a Carboxylated Cellulose Ester and an Acrylate Monomer Having X being $NCH_3$ as Detailed in the Description Section 65 g of hydroxyethyl methacrylate which contained 40 ppm of hydroquinone monomethyl ether was mixed with 5 g of N,N-dimethylaminoethyl methacrylate. Then 30 g of carboxylated cellulose ester frm the same lot as that used in Example 28 was dissolved in this combination of acrylate monomers. This formulation was tested on high carbon steel bolts as described in Example 10. The average torque required for the four bonds tested was 2 ft-lbs.

EXAMPLE 35

An Anaerobic Adhesive Formulated with a Carboxylated Cellulose Ester and an Acrylate Monomer having $R^2$ being Halogen as in the Detailed Description Section The carboxylated cellulose ester used in this formulation was from the same batch as that used in Example 28. The carboxylated cellulose ester was dissolved in methyl-, α-chloroacrylate which contained 20 ppm of hydroquinone to a final concentration for the carboxylated cellulose ester of 10 weight percent. This formulation was tested on high carbon steel bolts as described in Example 1. The average torque required for the four bonds tested was 9 ft-lbs.

EXAMPLE 36

An Anaerobic Adhesive Formulated with a Carboxylated Cellulose Ester and Triethyl Amine as the Accelerator The carboxylated cellulose ester used in this formulation was from the same batch as that used in Example 28. The carboxylated cellulose ester was dissolved in hydroxyethyl methacrylate which contained 40 ppm hydroquinone monomethyl ether to a final concentration for the carboxylated cellulose ester of 30 weight percent of the solution. Triethylamine was added to an aliquot of this solution to make a final formulation which was 2 weight percent in triethylamine. This formulation was tested on high carbon steel bolts as described in Example 10. The average torque required for the four bonds tested was 6 ft-lbs.

I claim:
1. An adhesive composition comprising:
(A) at least one carboxylated cellulose ester having an acid number greater than or equal to about 5 and less than or equal to about 50, a peroxide value of from about 0.05 to about 2, and from about 0.4 to about 4.0% by weight total carboxyl groups;
(B) at least one acrylate monomer; and
(C) at least one hydroquinone-based stabilizer, The components (A), (B), and (C) being of a chemical nature and present in quantities and proportions such that when the final formulation is exposed to the atmosphere, said formulation will remain fluid and not cure for at least 8 hours at ambient temperature and that, when placed between surfaces which exclude the atmosphere from said formulation, said formulation will cure to form an effective adhesive bond between the surfaces within 24 hours at ambient temperature.

2. An adhesive composition comprising:
(A) at least one carboxylated cellulose ester having an acid number greater than or equal to about 5 and less than or equal to about 50, a peroxide value of from about 0.05 to about 2, and from about 0.4 to about 4.0% by weight total carboxyl groups;
(B) at least one acrylate monomer of the following formulas:
(a)

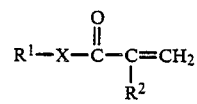

wherein X is O or $NR^3$,
$R^1$ is H, phenyl or a straight-chain, branched or alicyclic alkyl radical of 1 to 8 carbon atoms,
$R^2$ is H, halogen, or a straight-chain or branched alkyl radical of 1 to 4 carbon atoms, and
$R^3$ is H or a straight-chain, branched, or alicyclic alkyl radical of 1 to 8 carbon atoms,
(b)

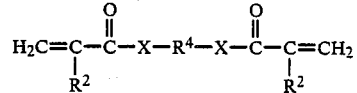

wherein each X, independently, and each $R^2$, independently, are as defined hereinabove, and $R^4$ is a straight-chain, branched or alicyclic alkyl diradical of 2 to 8 carbon atoms such that no carbon atoms has more than one X bonded to it,
(c)

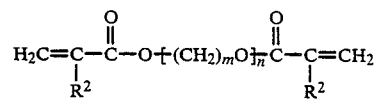

wherein each $R^2$, independently, is as defined hereinabove, m is 2, 3 or 4, and n is an integer of 1 to 12, or
(d)

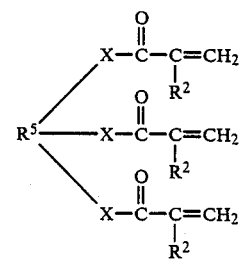

wherein each X, independently, and each $R^2$, independently, are as defined hereinabove, and $R^5$ is a straight-chain, branched or alicyclic alkyl triradical of 3 to 8 carbon atoms with a structure such that no carbon atom has more than one X bonded to it; and (C) at least one hydroquinone-based stabilizer of the formula

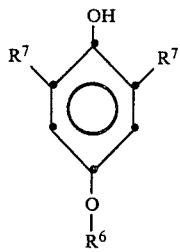

wherein $R^6$ is H or a straight or branched alkyl radical of 1 to 4 carbon atoms, and each $R^7$, independently, is H or a straight, branched or alicyclic alkyl radical of 1 to 8 carbon atoms;

the components (A), (B), and (C) being present in quantities and proportions such that when the final formulation is exposed to the atmosphere, said formulation will remain fluid and not cure for at least 8 hours at ambient temperature and that, when placed between surfaces which exclude the atmosphere from said formulation, said formulation will cure to form an effective adhesive bond between the surfaces within 24 hours at ambient temperature, provided that:

(1) the acrylate monomer or combination thereof must be able to dissolve the carboxylated cellulose ester to a final concentration of at least about 3 weight percent, based on the weight of carboxylated cellulose ester plus acrylate monomer, (2) phenyl-containing acrylate monomers must be used in combination with other acrylate monomers and the combination of acrylate monomers must be such that if one or more of the monomers has a phenyl radical as $R^1$ then the phenyl-containing monomers must be about equimolar or less relative to the other acrylate monomers, and (3) the total amount of acrylate monomers having X being $NR^3$ must be present at a molar level less than the sum of the total moles of carboxyl groups from the carboxylated cellulose ester and twice the total molar equivalent of peroxide content of the cellulose ester.

3. The adhesive composition of claim 1 wherein component (A) is present at a concentration of from about 3 weight percent to about 30 weight percent based on the total weight of components (A) and (B); and component (C) is present at a concentration of greater than about 20 ppm and less than about 500 ppm based on the total weight of component (B).

4. The adhesive composition of claim 2 wherein component (A) is present at a concentration of from about 3 weight percent to about 30 weight percent based on the total weight of components (A) and (B); and component (C) is present at a concentration of greater than about 20 ppm and less than about 500 ppm based on the total weight of component (B).

5. The composition of claim 1 additionally containing at least one accelerator.

6. The composition of claim 2 additionally containing at least one accelerator.

7. The composition of claim 1 additionally containing at least one accelerator selected from the group consisting of:

(i) not greater than about 140 ppm, based on the weight of components (A) and (B), of cobalt ions that are soluble in component (B), (ii) not greater than about 50 ppm, based on the weight of components (A) and (B), of vanadium ions that are soluble in component (B), and (iii) not greater than about 5 weight percent, based on the weight of components (A) and (B), of at least one tertiary amine having the formula

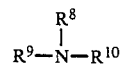

wherein each $R^8$, independently, is a straight-chain, branched or alicyclic alkyl radical of 1 to 8 carbon atoms, $R^9$ is a straight-chain, branched or alicyclic alkyl radical of 1 to 8 carbon atoms, and $R^{10}$ is phenyl, benzyl, or a straight-chain, branched or alicyclic alkyl radical of 2 to 8 carbon atoms.

8. The composition of claim 2 additionally containing at least one accelerator selected from the group consisting of:

(i) not greater than about 140 ppm, based on the weight of components (A) and (B), of cobalt ions that are soluble in component (B), (ii) not greater than about 50 ppm, based on the weight of components (A) and (B), of vanadium iions that are soluble in component (B), and (iii) not greater than about 5 weight percent, based on the weight of components (A) and (B), of at least one tertiary amine having the formula

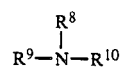

wherein each $R^8$, independently, is a straight-chain, branched or alicyclic alkyl radical of 1 to 8 carbon atoms, $R^9$ is a straight-chain, branched or alicyclic alkyl radical of 2 to 8 carbon atoms, and $R^{10}$ is phenyl, benzyl, or a straight-chain, branched or alicyclic alkyl radical of 2 to 8 carbon atoms.

9. The composition of claim 7 wherein $R^8$ is an alkyl radical of 1 or 2 carbon atoms, $R^9$ is an alkyl radical of 1 or 2 carbon atoms, and $R^{10}$ is phenyl or benzyl.

10. The composition of claim 8 wherein $R^8$ is an alkyl radical of 1 or 2 carbon atoms, $R^9$ is an alkyl radical of 1 or 2 carbon atoms, and $R^{10}$ is phenyl or benzyl.

11. The adhesive formulation of claim 1 wherein said carboxylated cellulose ester is a material having an inherent viscosity of from about 0.01 to about 1.00 determined according to ASTM D2857-70 procedure at 25° C. using a polymer concentration of 0.5% by weight in 60/40 by weight, phenol/tetrachloroethane solvent and wherein the anhydroglucose units thereof have ring substituents comprising by weight based on total polymer weight, of from about 0.05 to about 20% hydroxyl groups, from about 0.5 to about 44% acetyl groups, from 0 to about 54% butyryl groups, from 0 to about 47% propionyl groups, from about 0.4 to about 4.0% total carboxyl groups wherein from about 20% to about 100% of these carboxyl groups are non-saponifiable backbone, and wherein the material has a lactone level of from about $4.52 \times 10^{-5}$ to about $6.13 \times 10^{-4}$.

12. The adhesive formulation of claim 2 wherein said carboxylated cellulose ester is a material having an inherent viscosity of from about 0.01 to about 1.00 determined according to ASTM D2857-70 procedure at 25° C. using a polymer concentration of 0.5% by weight in 60/40 by weight, phenol/tetrachloroethane solvent and wherein the anhydroglucose units thereof have ring substituents comprising by weight based on total polymer weight, of from about 0.05 to about 20% hydroxyl groups, from about 0.5 to about 44% acetyl groups, from 0 to about 54% butyryl groups, from 0 to about 47% propionyl groups, from about 0.4 to about 4.0% total carboxyl groups wherein from about 20% to about 100% of these carboxyl groups are non-saponifiable backbone, and wherein the material has a lactone level of from about $4.52 \times 10^{-5}$ to about $6.13 \times 10^{-4}$.

13. The adhesive formulation of claim 11 wherein said carboxylated cellulose ester is a material having an inherent viscosity of from about 0.10 to about 0.30, a lactone level of from about $9.68 \times 10^{-5}$ to about $3.22 \times 10^{-4}$, a peroxide value of from about 0.10 to about 0.8 a DP:COOH from about 8 to about 25 and an HVR of from about 0.01 to about 0.95.

14. The adhesive formulation of claim 12 wherein said carboxylated cellulose ester is a material having an inherent viscosity of from about 0.10 to about 0.30, a lactone level of from about $9.68 \times 10^{-5}$ to about $3.22 \times 10^{-4}$, a peroxide value of from about 0.10 to about 0.8 a DP:COOH from about 8 to about 25 and an HVR of from about 0.01 to about 0.95.

15. The adhesive composition of claim 13 wherein the acid number of the carboxylated cellulose ester is from about 10 to about 25 and the peroxide content is from about 0.2 to about 0.6.

16. The adhesive composition of claim 14 wherein the acid number of the carboxylated cellulse ester is from about 10 to about 25 and the peroxide content is from about 0.2 to about 0.6.

17. The adhesive composition of claim 15 wherein said carboxylated cellulose ester is carboxylated cellulose acetate butyrate or carboxylated cellulose acetate propionate.

18. The adhesive composition of claim 16 wherein said carboxylated cellulose ester is carboxylated cellulose acetate butyrate or carboxylated cellulose acetate propionate.

19. The adhesive composition of claim 3 wherein said weight percent of component (A) is from about 5 to about 20.

20. The adhesive composition of claim 4 wherein said weight percent of component (A) is from about 5 to about 20.

21. The adhesive formulation of claim 1 wherein said acrylate monomer is selected from the group consisting of acrylic acid, methacrylic acid, hydroxyethyl methacrylate, hydroxypropyl methacrylate and methyl methacrylate.

22. The adhesive formulation of claim 2 wherein said acrylate monomer is selected from the group consisting of acrylic acid, methacrylic acid, hydroxyethyl methacrylate, hydroxypropyl methacrylate and methyl methacrylate.

23. The adhesive formulation of claim 2 wherein X is O, $R^1$ is H or a straight, branched or alicyclic alkyl radical of 1 to 6 carbon atoms, $R^2$ is H or an alkyl radical of 1 or 2 carbon atoms, $R^6$ is H or an alkyl radical of 1 or 2 carbon atoms, and $R^7$ is H or a straight, branched or alicyclic alkyl radical of 1 to 4 carbon atoms.

24. The adhesive formulation of claim 5 wherein said accelerator is N,N-dimethyltoluidine.

25. The adhesive formulation of claim 6 wherein said accelerator is N,N-dimethyltoluidine.

26. The composition of claim 5 in the form of a two-package formulation wherein the first package comprises at least one acrylate monomer, at least one stabilizer, and at least one carboxylated cellulose ester, and the second package comprises at least one acrylate monomer, at least one stabilizer, and at least one accelerator.

27. The composition of claim 6 in the form of a two-package formulation wherein the first package comprises at least one acrylate monomer, at least one stabilizer, and at least one carboxylated cellulose ester, and the second package comprises at least one acrylate monomer, at least one stabilizer, and at least one accelerator.

28. The composition of claim 7 in the form of a two-package formulation wherein the first package comprises at least one acrylate monomer, at least one stabilizer, and at least one carboxylated cellulose ester, and the second package comprises at least one acrylate monomer, at least one stabilizer, and at least one accelerator.

29. The composition of claim 8 in the form of a two-package formulation wherein the first package comprises at least one acrylate monomer, at least one stabilizer, and at least one carboxylated cellulose ester, and the second package comprises at least one acrylate monomer, at least one stabilizer, and at least one accelerator.

* * * * *